(12) United States Patent
Kang et al.

(10) Patent No.: US 10,652,458 B2
(45) Date of Patent: May 12, 2020

(54) CAMERA MODULE AND ELECTRONIC DEVICE INCLUDING THE SAME

(71) Applicant: Samsung Electronics Co., Ltd., Gyeonggi-do (KR)

(72) Inventors: Yoon-seok Kang, Seoul (KR); Bae-seok Lim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 752 days.

(21) Appl. No.: 15/140,608

(22) Filed: Apr. 28, 2016

(65) Prior Publication Data

US 2016/0337583 A1 Nov. 17, 2016

(30) Foreign Application Priority Data

May 15, 2015 (KR) ........................ 10-2015-0068189

(51) Int. Cl.
*H04N 5/00* (2011.01)
*H04N 5/232* (2006.01)
*H04N 5/225* (2006.01)

(52) U.S. Cl.
CPC ....... *H04N 5/23238* (2013.01); *H04N 5/2254* (2013.01); *H04N 5/2257* (2013.01); *H04N 5/2258* (2013.01)

(58) Field of Classification Search
CPC .......................... H04N 5/23238; H04N 5/2254
USPC .......................................................... 348/73
See application file for complete search history.

(56) References Cited

U.S. PATENT DOCUMENTS

| | | | | |
|---|---|---|---|---|
| 6,002,430 A * | 12/1999 | McCall | ............. | H04N 5/23238 348/143 |
| 7,426,085 B2 * | 9/2008 | Yoshitsugu | .......... | G02B 15/163 359/687 |
| 7,773,871 B2 | 8/2010 | Ishizuka | | |
| 8,730,299 B1 * | 5/2014 | Kozko | ................. | H04N 5/2254 348/38 |
| 2005/0280903 A1 * | 12/2005 | Oshima | .................. | G02B 7/102 359/697 |
| 2006/0034001 A1 * | 2/2006 | Nagai | .................... | G02B 7/102 359/694 |
| 2007/0126911 A1 * | 6/2007 | Nanjo | ................. | G02B 15/177 348/335 |
| 2008/0174670 A1 * | 7/2008 | Olsen | ................ | H01L 27/14645 348/222.1 |
| 2008/0273251 A1 * | 11/2008 | Huang | .................. | G02B 7/102 359/696 |

(Continued)

FOREIGN PATENT DOCUMENTS

| | | | |
|---|---|---|---|
| JP | 2006-154677 A | | 6/2006 |
| JP | 2014095830 A | * | 5/2014 |
| WO | WO-2009133665 A1 | * | 11/2009 ........... G02B 15/161 |

*Primary Examiner* — Tsion B Owens
*Assistant Examiner* — Shanika M Brumfield
(74) *Attorney, Agent, or Firm* — Cha & Reiter, LLC.

(57) ABSTRACT

A camera module comprising: a first optical system and a second optical system, each of the first and second optical systems including: a first frame configured to support a first lens group and move along an optical axis in a first direction; and a second frame configured to support a reflector configured to reflect light passing through the first lens group, and move in a second direction that is different from the first direction.

13 Claims, 11 Drawing Sheets

(56) References Cited

U.S. PATENT DOCUMENTS

| | | | |
|---|---|---|---|
| 2010/0061713 A1* | 3/2010 | Uehara | G03B 17/00 396/439 |
| 2010/0097713 A1* | 4/2010 | Miura | G02B 7/021 359/824 |
| 2011/0051257 A1* | 3/2011 | Wada | G02B 15/177 359/683 |
| 2011/0158621 A1* | 6/2011 | Honsho | G02B 7/102 396/55 |
| 2012/0206565 A1* | 8/2012 | Villmer | H04N 1/00 348/36 |
| 2014/0362242 A1 | 12/2014 | Takizawa | |
| 2016/0274338 A1* | 9/2016 | Davies | G03B 17/12 |

* cited by examiner

CAMERA MODULE AND ELECTRONIC DEVICE INCLUDING THE SAME

CLAIM OF PRIORITY

This application claims the benefit of Korean Patent Application No. 10-2015-0068189, filed on May 15, 2015, in the Korean Intellectual Property Office, the disclosure of which is incorporated herein in its entirety by reference.

BACKGROUND

1. Field

The present disclosure relates to camera modules and electronic devices including the same.

2. Description of the Related Art

As technology has been developed, an electronic device including a camera module, for example, a photographing device may provide various functions. For example, a user may perform 360° omnidirectional photographing with the photographing device.

For example, as a structure for 360° photographing, a camera module may include two or more optical systems that are arranged in different directions from each other. By using the two or more optical systems, it is possible to perform 360° photographing including photographing the front and rear of a user.

However, such a structure may cause an increase in thickness of the camera module since the two or more optical systems need to be arranged in different directions from each other.

SUMMARY

Provided are a camera module capable of 360° photographing and reducing its thickness when it is not being used, and an electronic device including the same.

Additional aspects will be set forth in part in the description which follows and, in part, will be apparent from the description, or may be learned by practice of the presented embodiments.

According to an aspect of an embodiment, a camera module includes: a first optical system and a second optical system that are arranged in opposite directions to each other in a housing, each of the first and second optical systems including: a first frame configured to support at least one of first lens groups and configured to move along an optical axis; and a second frame configured to support a reflector configured to reflect light incident through the first lens group, wherein a moving direction of the second frame is different from a moving direction of the first frame.

Each of the first and second optical systems may be capable of moving between a projection position, wherein at least a part of the first lens group may project outside the housing, and a storage position, wherein the first lens group may be stored in the housing.

The optical axis may include a first optical axis penetrating through the first lens group and a second optical axis reflected by the reflector and extending in a direction perpendicular to the first optical axis. The first frame may be capable of moving along the first optical axis, and the second frame may be capable of moving in a direction perpendicular to the first and second optical axes.

When the first and second optical systems may be in the storage position, each of the reflectors of the second frames of the first and second optical systems may be located in a position deviated from the optical axis.

The first frames of the first and second optical systems may move in opposite directions to each other, and the second frames of the first and second optical systems may move in a same direction.

A movement of a position of the first frame may be interlocked with a movement of a position of the second frame.

The first frame may include a contact surface capable of contacting the second frame, and a part of the contact surface may be a slope oblique to a moving direction of the second frame.

The camera module may further include at least one elastic member configured to provide an elastic force in a direction of accessing the first frames of the first and second optical systems.

The housing may further include a stopper configured to restrict moving distances of the first frames of the first and second optical systems by using the elastic member.

The camera module may further include first and second guide units configured to guide moving positions of the first and second frames.

The camera module may further include a detection sensor configured to detect moving of a position of at least one of the first and second frames.

The camera module may further include a driving unit configured to provide the second frame with a driving force for moving a position of the second frame.

When the first and second optical systems may be in the storage position, the camera module may further include a lens cover configured to protect each of the first lens groups of the first and second optical systems.

The second frame may be further configured to support an image sensor receiving light reflected by the reflector.

The second frame may be configured to support a second lens group arranged between the reflector and the image sensor.

According to an aspect of another embodiment, an electronic device includes a camera module, the camera module including: a first optical system and a second optical system that are arranged in opposite directions to each other in a housing, wherein each of the first and second optical systems includes: a first frame configured to support at least one of first lens groups and configured to move along an optical axis; and a second frame configured to support a reflector configured to reflect light incident through the first lens group, wherein a moving direction of the second frame is different from a moving direction of the first frame.

According to aspects of the disclosure, a camera module is provided comprising: a first optical system and a second optical system, each of the first and second optical systems including: a first frame configured to support a first lens group and move along an optical axis in a first direction; and a second frame configured to support a reflector configured to reflect light passing through the first lens group, and move in a second direction that is different from the first direction.

According to aspects of the disclosure, an electronic device is provided comprising a camera module, the camera module comprising: a first optical system and a second optical system that are arranged in opposite directions, each of the first and second optical systems including: a first frame configured to support a first lens group and move along an optical axis in a first direction; and a second frame configured to support a reflector configured to reflect light passing through the first lens group, and move in a second direction that is different from the first direction.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects thereof. It will be understood that, although the terms first, second, etc. may be used herein to describe various elements, these elements should not be limited by these terms. These terms are only used to distinguish one element from another. Thus, a first element, component, region, layer or section discussed below could be termed a second element, component, region, layer or section without departing from the teachings of the present disclosure. Expressions such as "at least one of," when preceding a list of elements, modify the entire list of elements and do not modify the individual elements of the list.

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Figure 1A:
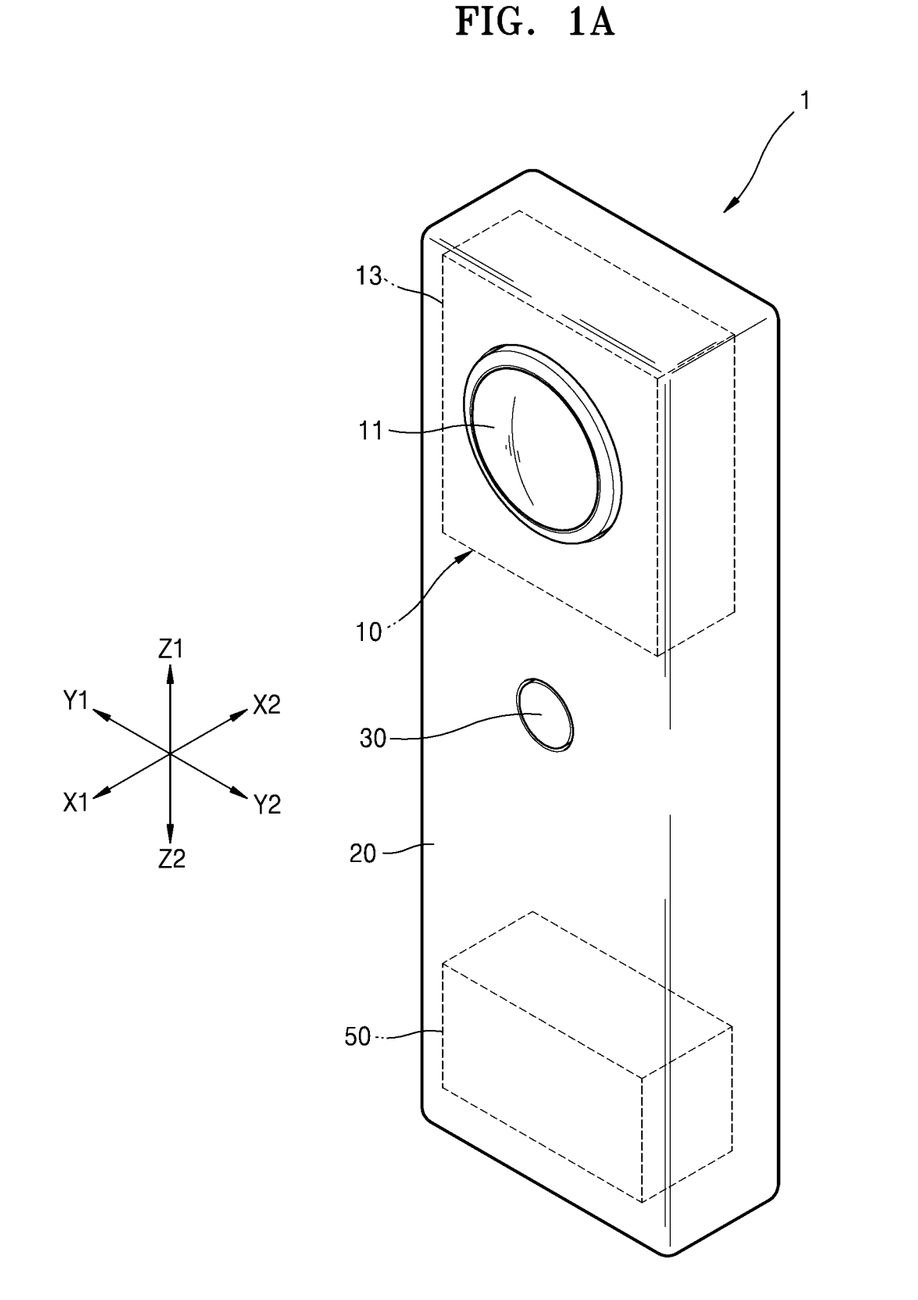
FIG. 1A is perspective view of an example of an electronic device, according to various embodiments of the present disclosure.
Figure 1B:
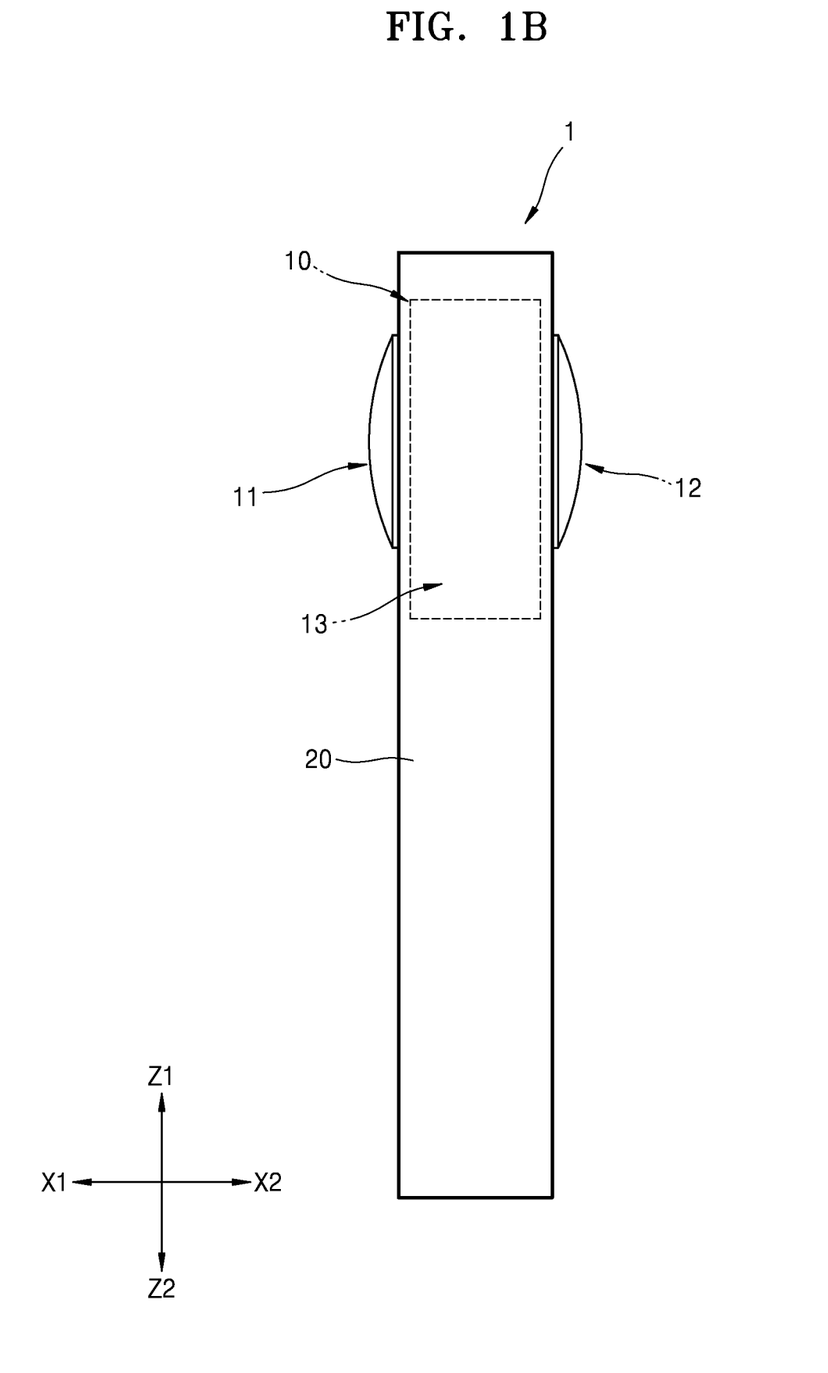
FIG. 1B is a side view of an example of an electronic device, according to various embodiments of the present disclosure.
Figure 2:
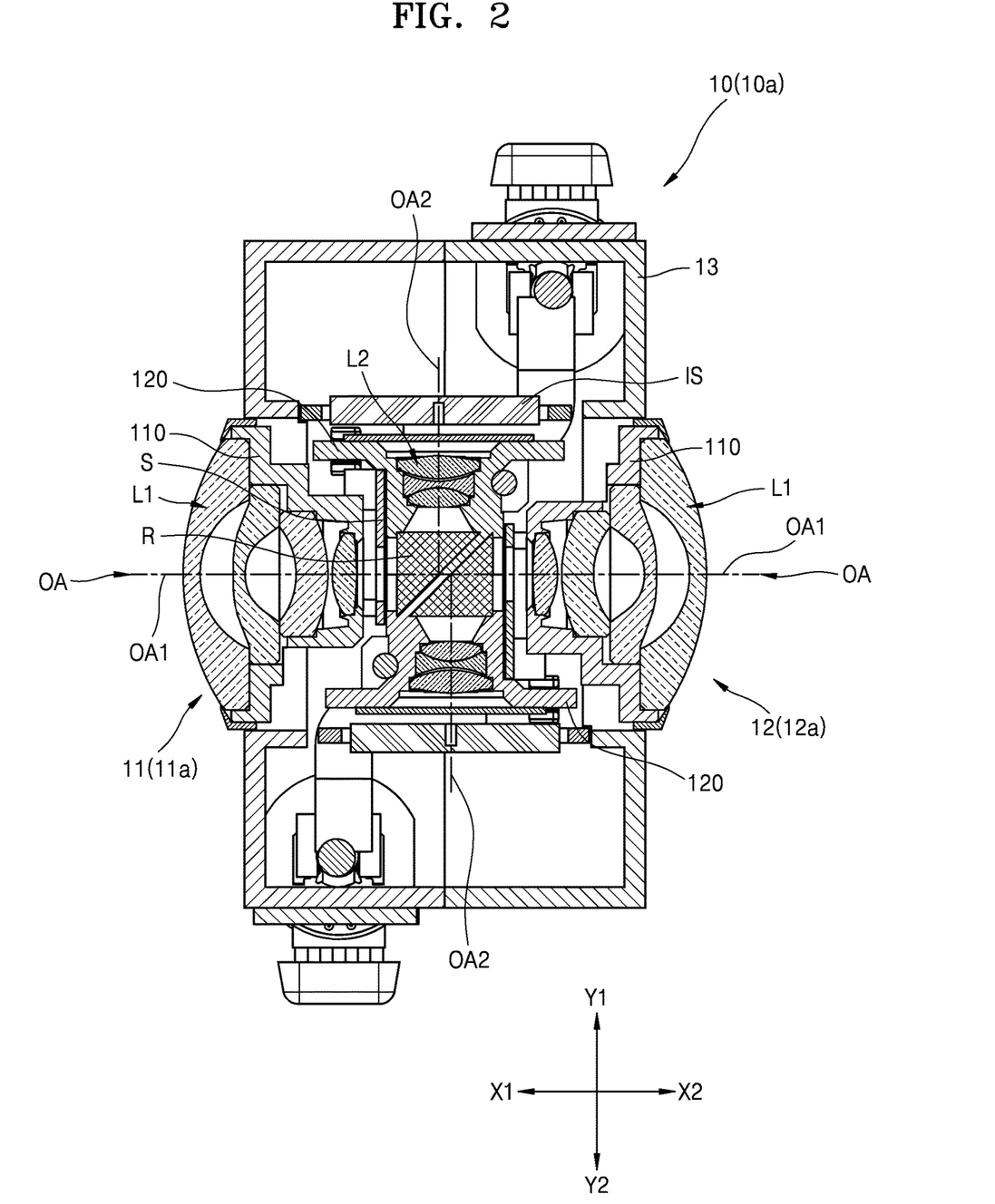
FIG. 2 is a cross-sectional view of an example of a camera module, according to various embodiments of the present disclosure.

FIGS. 1A and 1B are, respectively, a perspective view and a side view illustrating an electronic device 1 including a camera module 10, in which the camera module 10 is activated, according to an embodiment. FIG. 2 is a cross-sectional view illustrating the camera module 10 of FIG. 1A. Since the camera module 10 is activated, it is possible to take a photo via the camera module 10.

Referring to FIG. 1A, FIG. 1B, and FIG. 2, the electronic device 1 according to an embodiment includes the camera module 10. The electronic device 1 may take a photo via the camera module 10. According to aspects of the disclosure, the electronic device 1 may include any suitable type of device, such as a photographing device (e.g., a camera) and a portable device (e.g., a smartphone).

The electronic device 1 may further include, in addition to the camera module 10, an input unit 30 arranged in a case 20 and a controller 50 for controlling the camera module 10. Via the input unit 30, information for setting on/off or a photographing mode of the camera module 10 may be input to the electronic device 1. Furthermore, the electronic device 1 may further include a wired or wireless communication module (not shown) for communication with an external device.

The camera module 10 may include first and second optical systems 11 and 12 that are arranged in opposite directions to each other, and a housing 13 in which at least some parts of the first and second optical systems 11 and 12 are received. The housing 13 may have two combined bodies but is not limited thereto, and may have just one body.

The first optical system 11 may be arranged in a first direction X1 and the second optical system 12 may be arranged in a second direction X2 opposite to the first direction X1.

The first optical system 11 may include at least one of a first lens group L1, reflector R, second lens group L2, and image sensor IS. The first optical system 11 may further include a shutter S disposed between one of the first lens groups L1 and one of the reflectors R. The reflector R may be a reflective prism.

Light passing through the first lens group L1 may be reflected by the reflector R, and the reflected light may reach the image sensor IS through one of the second lens groups L2. The shutter S may selectively block the light passing through the first lens group L1.

An optical axis OA of the first optical system 11 may include a first optical axis OA1 penetrating through the first lens group L1 and a second optical axis OA2 reflected by the reflector R and extending in a direction perpendicular (or otherwise transverse) to the first optical axis OA1. The first optical axis OA1 may be parallel to the first direction X1 or the second direction X2, and the second optical axis OA2 may be parallel to a Y1 direction or a Y2 direction in FIG. 2.

The first lens group L1 may have a viewing angle of 200° or greater. At least a part of the first lens group L1 of the first optical system 11 may project outside the housing 13. The first optical system 11 may be located in a projection position 11a.

The second optical system 12 may include at least one of a first lens group L1, reflector R, second lens group L2, and image sensor IS. The first optical system 12 may further include a shutter S disposed between one of the first lens groups L1 and one of the reflectors R.

Light passing through the first lens group L1 may be reflected by the reflector R, and the reflected light may reach the image sensor IS through one of the second lens groups L2. The shutter S may selectively block the light passing through the first lens group L1.

An optical axis OA of the first optical system 11 may include a first optical axis OA1 extending through the first lens group L1 and a second optical axis OA2 extending in a direction in which light is reflected by the reflector R. In some implementations, the optical axis OA2 extends may be perpendicular (or otherwise transverse) to the first optical axis OA1. The first optical axis OA1 of the second optical system 12 may extend in a direction that is the same as or parallel to the direction in which the first optical axis OA1 of the first optical system 11 extends. Furthermore, the direction in which the second optical axis OA2 of the second optical system 12 extends may be the same as or parallel to the direction in which the second optical axis OA2 of the first optical system 11 extends. The first optical axis OA1 may be parallel to an X1-X2 axis, and the second optical axis OA2 may be parallel to the Y1-Y2 axis.

The first lens group L1 may have an angle of view of 200° or greater. At least a part of the first lens group L1 of the second optical system 12 may project outside the housing 13. The second optical system 12 may be located in a projection position 12a.

As described above, the first optical system 11 may have an angle of view of 200° or greater in the first direction X1 and the second optical system 12 may have an angle of view of 200° or greater in the second direction X2, and thus, the camera module 10 may be capable of performing 360° photographing with a single shot, according to an embodiment. For example, a user may perform 360° photographing without rotating or shifting the electronic device 1.

However, as described above, as the first and second optical systems 11 and 12 are arranged in opposite directions to each other for 360° photographing, the thickness of the camera module 10 may increase compared to when using a single optical system.

Hereinafter, it will be described that a structure of the camera module 10 capable of minimizing thickness even when including the first and second optical systems 11 and 12 that are arranged in opposite directions to each other.

Figure 3A:
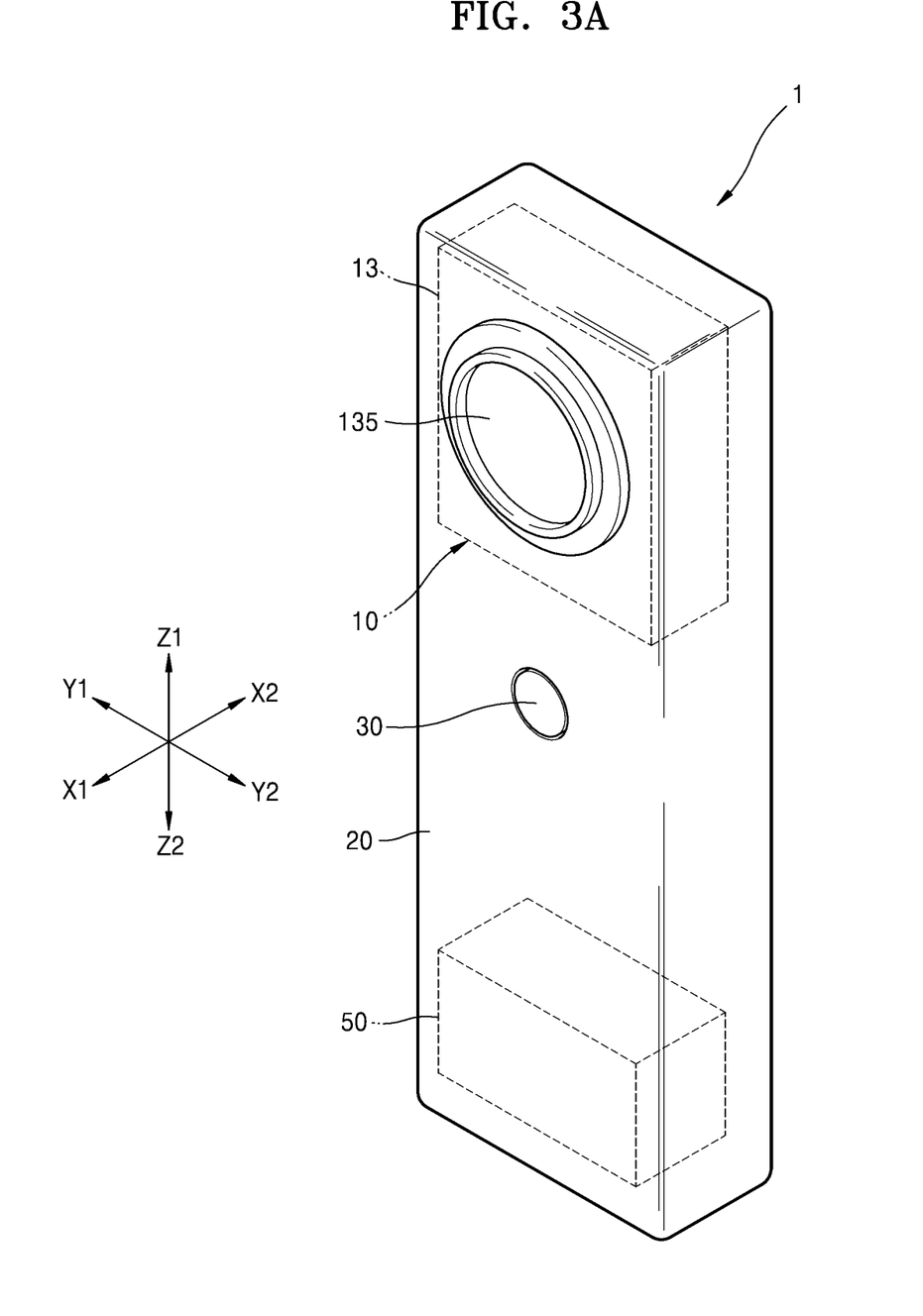
FIG. 3A is a perspective view of an example of an electronic device, according to various embodiments of the present disclosure.
Figure 3B:
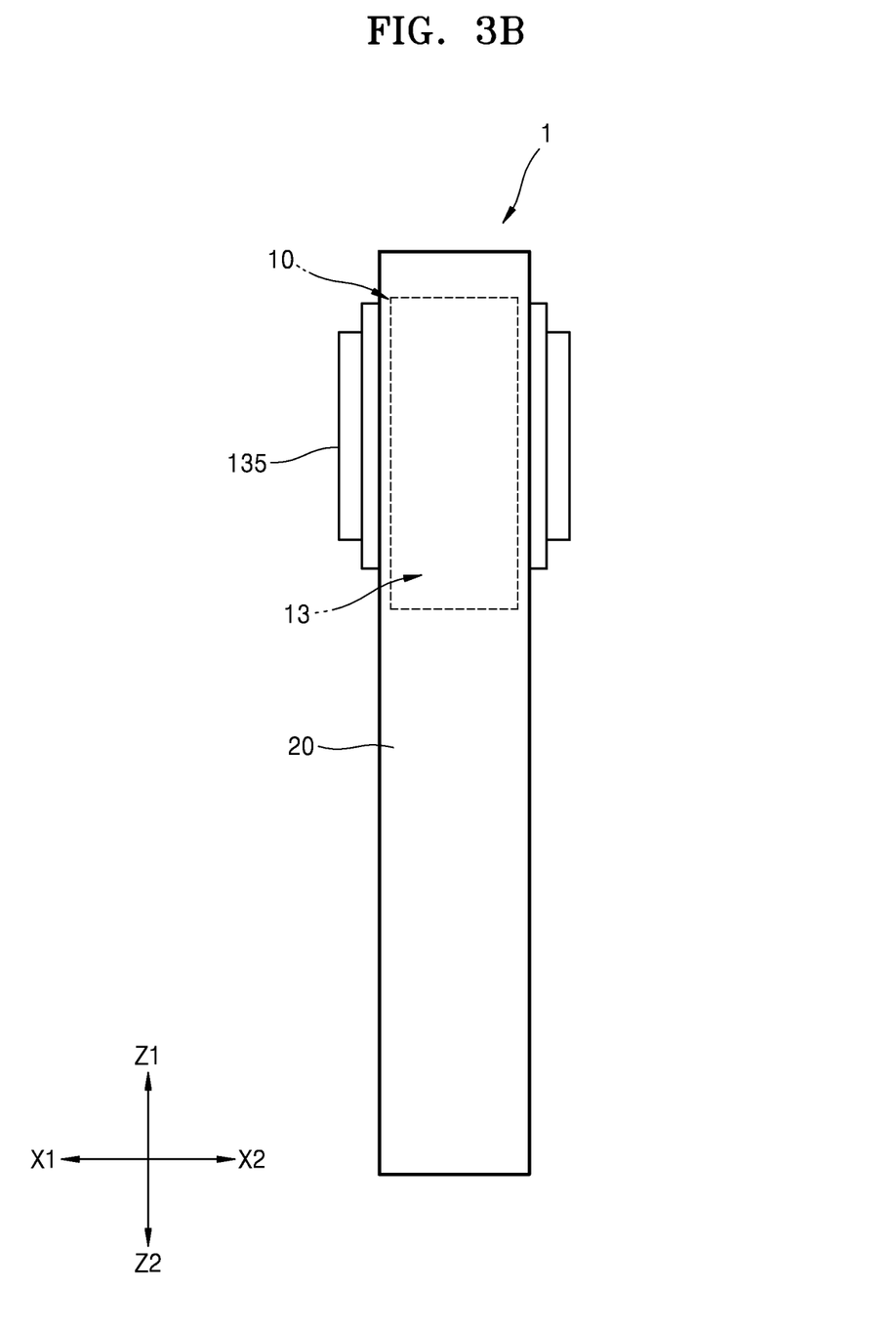
FIG. 3B is a side view of an example of an electronic device, according to various embodiments of the present disclosure.
Figure 4:
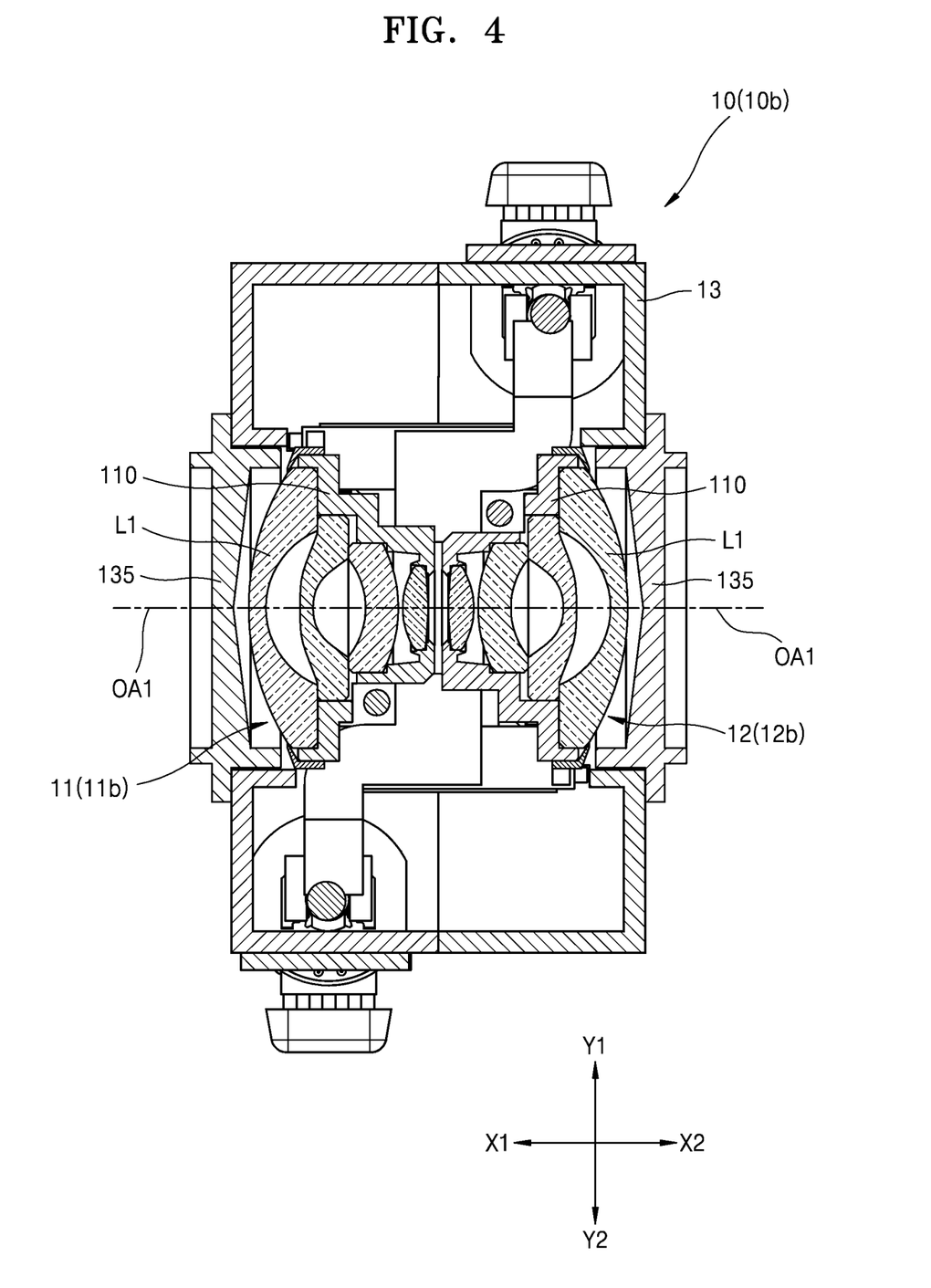
FIG. 4 is a cross-sectional view of an example of a camera module, according to various embodiments of the present disclosure.

FIGS. 3A and 3B are, respectively, a perspective view and a side view illustrating an electronic device 1 including a camera module 10, in which the camera module 10 is not activated, according to an embodiment. FIG. 4 is a cross-sectional view illustrating the camera module 10 of FIG. 3A. Since the camera module 10 is not activated, it is impossible to take a photo via the camera module 10.

According to an embodiment, thickness of the camera module 10 may change according to whether the camera module 10 is activated or not.

For example, when the camera module 10a is activated as in FIG. 1A, FIG. 1B, and FIG. 2, at least a part of the first lens group L1 of each of the first and second optical systems 11 and 12 may project outside the housing 13.

On the other hand, when the camera module 10 is not activated, as described in FIG. 3A, FIG. 3B, and FIG. 4, the first lens group L1 of each of the first and second optical systems 11 and 12 may be received in the housing 13. For example, the first and second optical systems 11 and 12 may be located in storage positions 11b and 12b. When the first and second optical systems 11 and 12 are located in the storage positions 11b and 12b, the first lens groups L1 of the first and second optical systems 11 and 12 may be protected by a lens cover 135.

According to an embodiment, it is possible to reduce the thickness of the camera module 10 when it is not being used, while ensuring a sufficient optical path when using the camera module 10.

As described above, in order to reduce the thickness of the camera module 10 when it is not being used, the first and second optical systems 11 and 12 may include first and second frames 110 and 120, respectively. However, moving directions of the first and second frames 110 and 120 may be different from each other.

Referring to FIG. 2, the first frame 110 may support at least one of the first lens groups L1 and may move along the optical axis OA. The second frame 120 may support the reflector R and may move in a direction that is perpendicular (or otherwise transverse) to a moving direction of the first frame 110. By moving the second frame 120 in a direction perpendicular to the moving direction of the first frame 110, the thickness of the camera module 10 may be reduced corresponding to a thickness of the reflector R. The thickness of the housing 13 may be less than a sum of thicknesses of the first lens group L1 of the first optical system 11, the first lens group L1 of the second optical system 12, and the reflector R.

Here, when the reflectors R of the first and second optical systems 11 and 12 are superimposed on each other, the thickness of the reflector R may indicate not a sum of respective thicknesses of the reflectors R but the entire thickness of the reflectors R. Furthermore, the thickness of the camera module 10 may be defined as a distance between a tip of the first lens group L1 of the first optical system 11 and a tip of the first lens group L1 of the second optical system 12.

Figure 5:
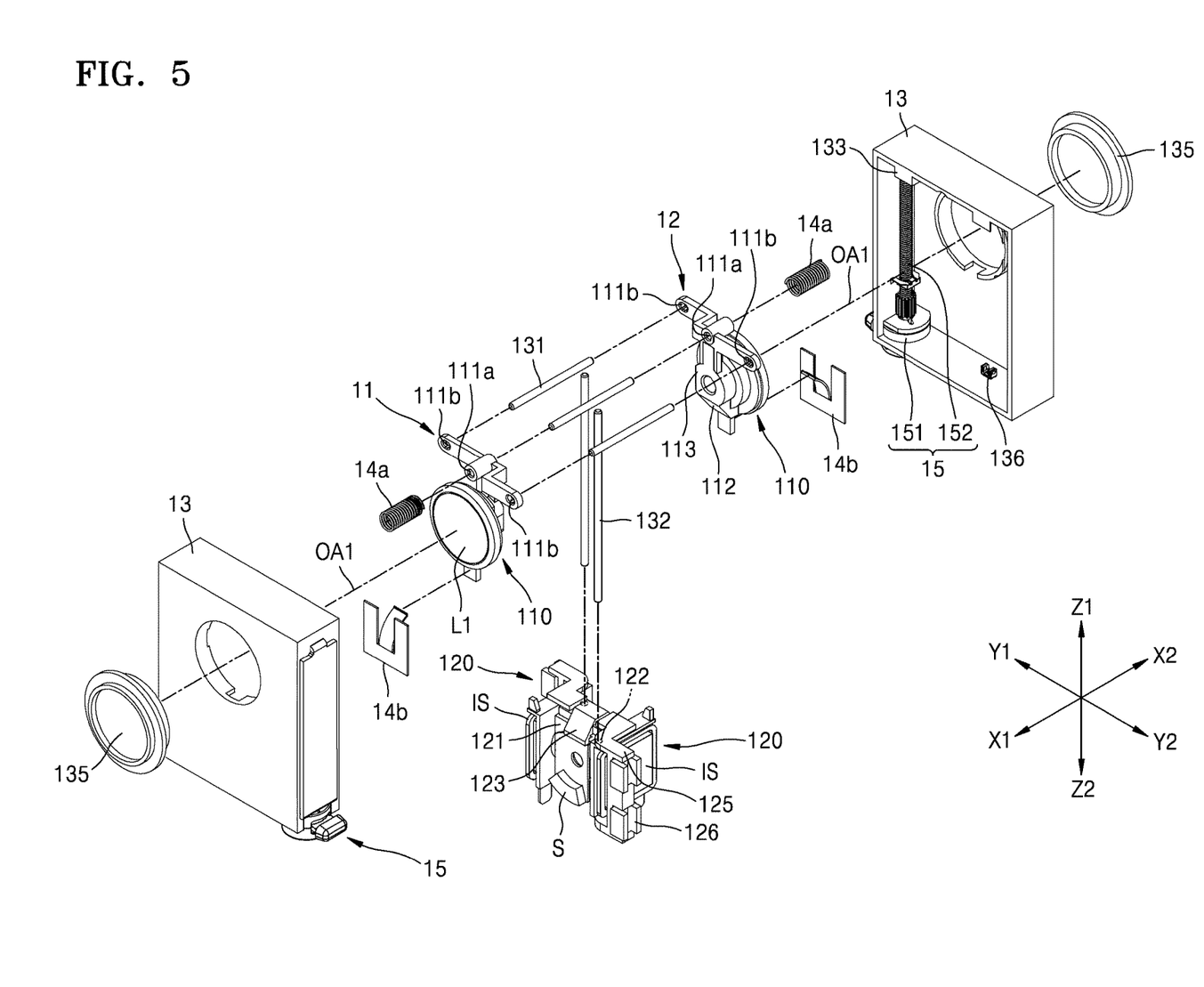
FIG. 5 is an exploded perspective view of an example a camera module, according to various embodiments of the present disclosure.
Figure 6A:
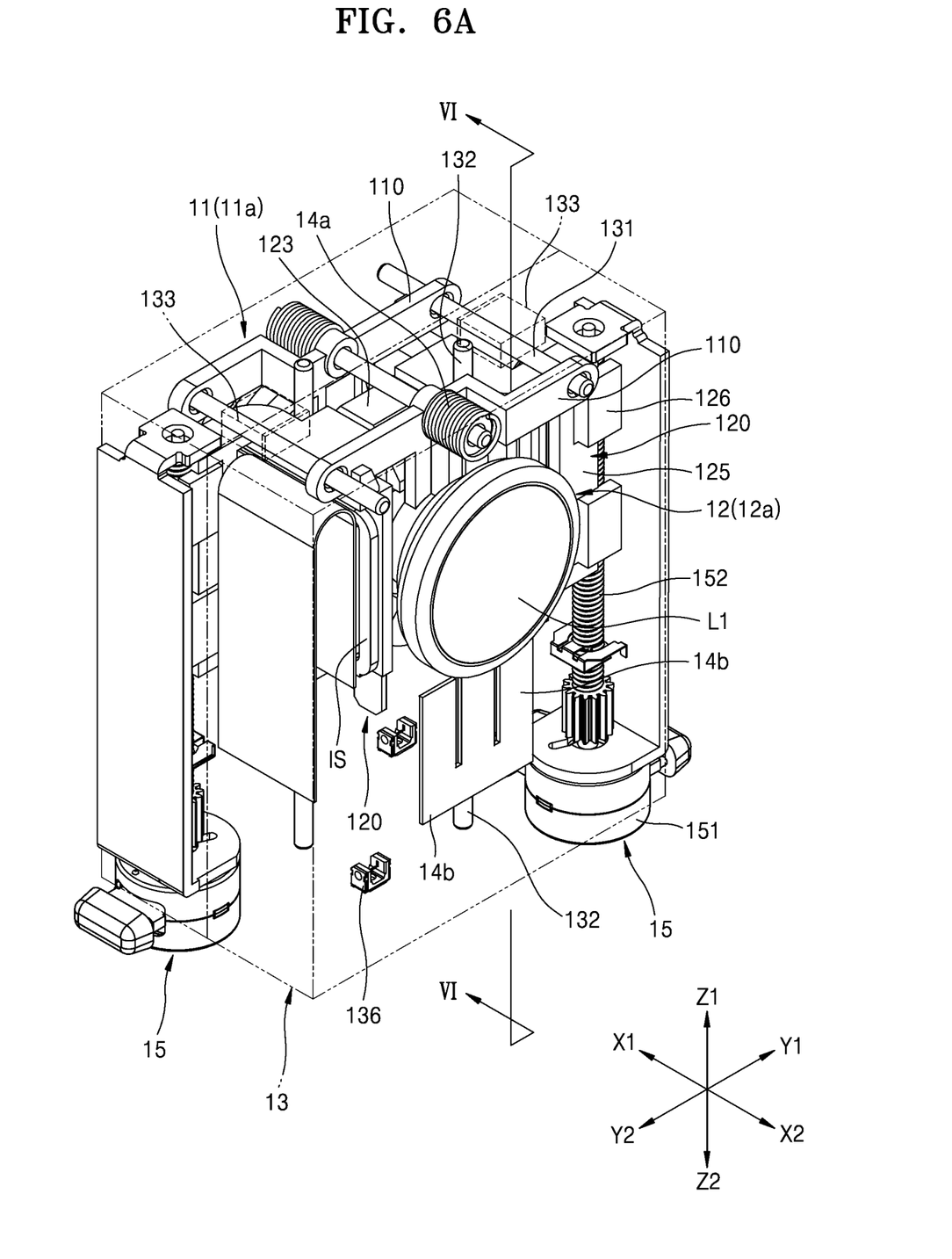
FIG. 6A is a perspective view illustrating an example of a camera module in an active state, according to various embodiments of the present disclosure.
Figure 6B:
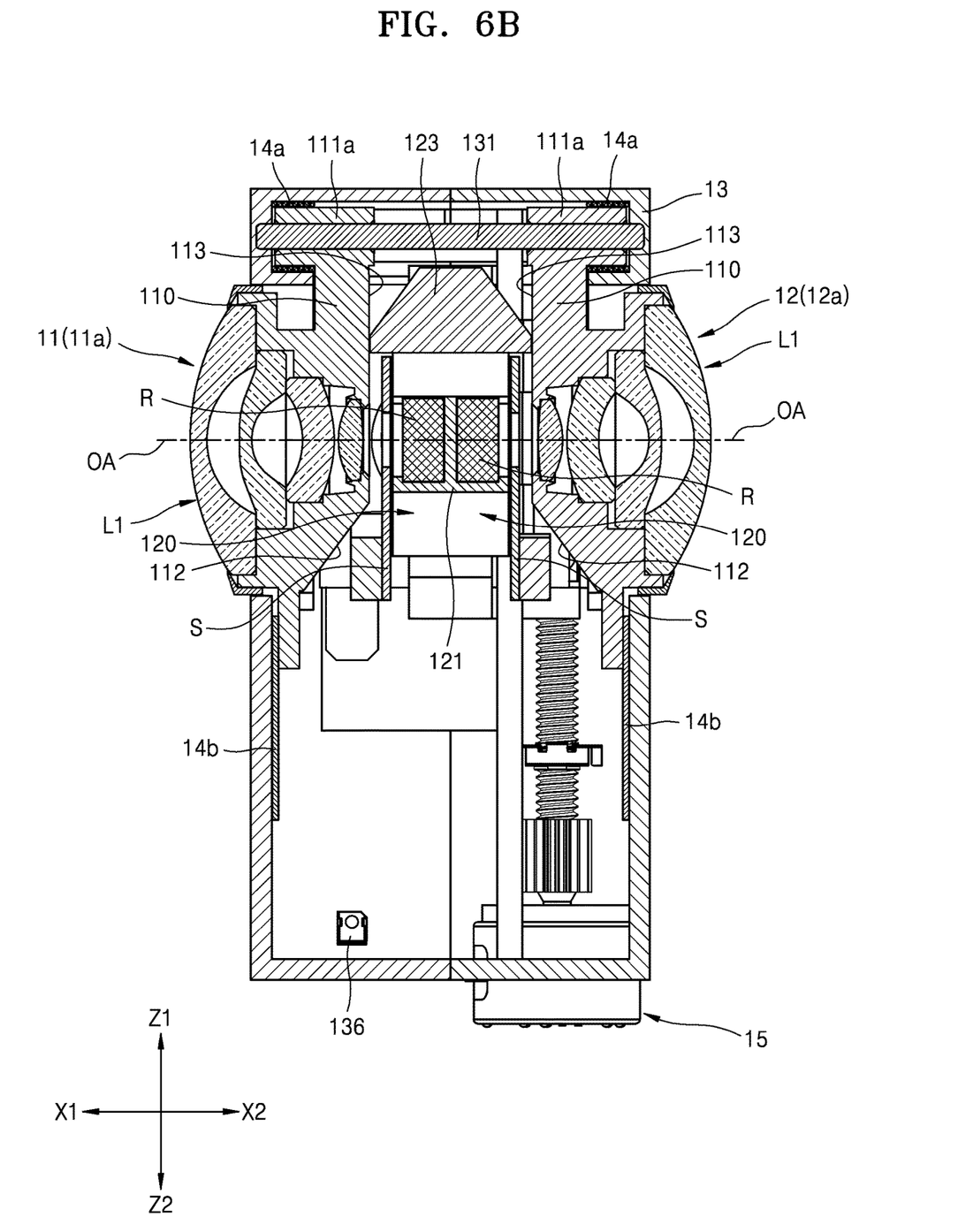
FIG. 6B is a cross-sectional view of the camera module of FIG. 6A, according to various embodiments of the present disclosure.
Figure 7A:
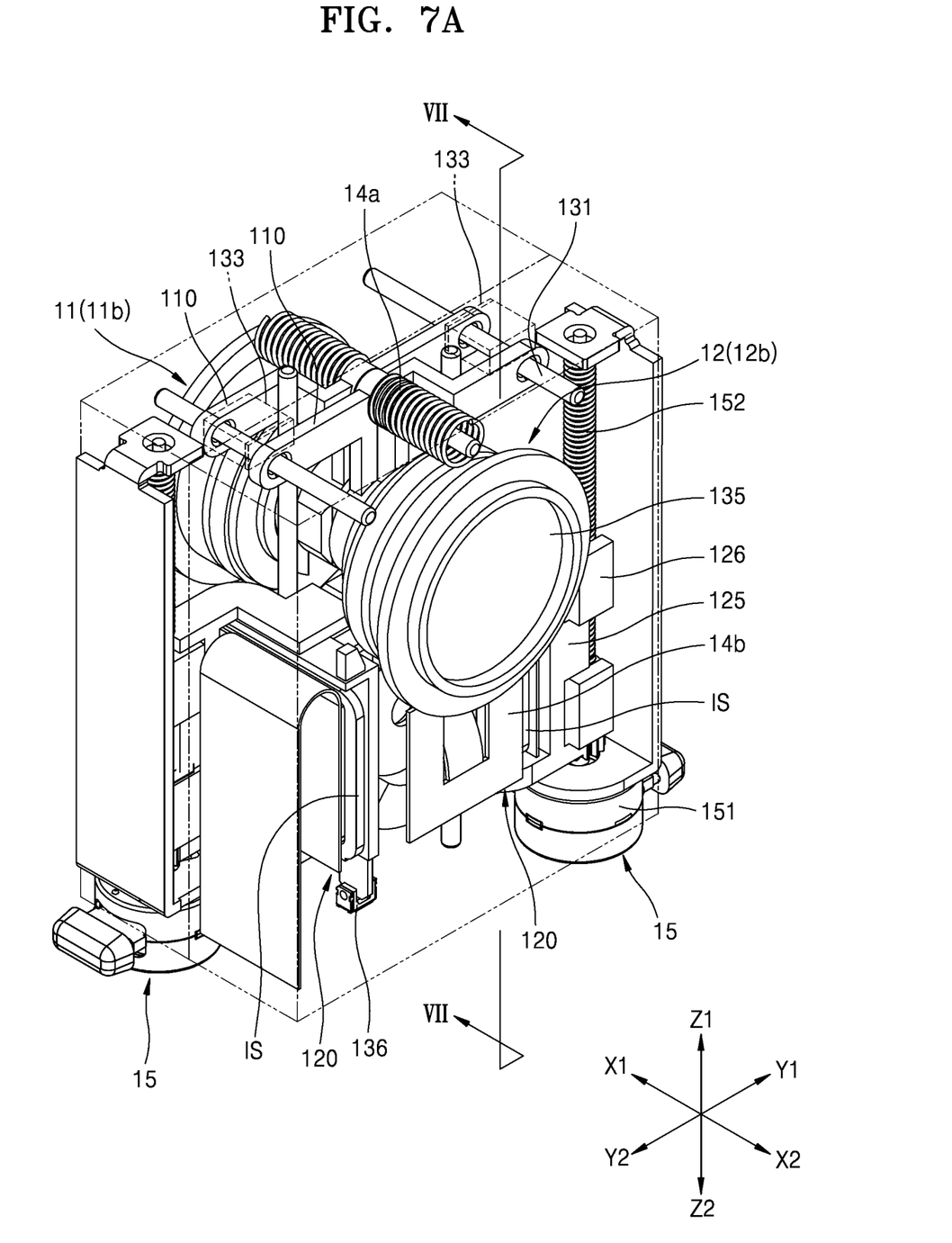
FIG. 7A is a perspective view illustrating an example of a camera module in an inactive state, according to various embodiments of the present disclosure.
Figure 7B:
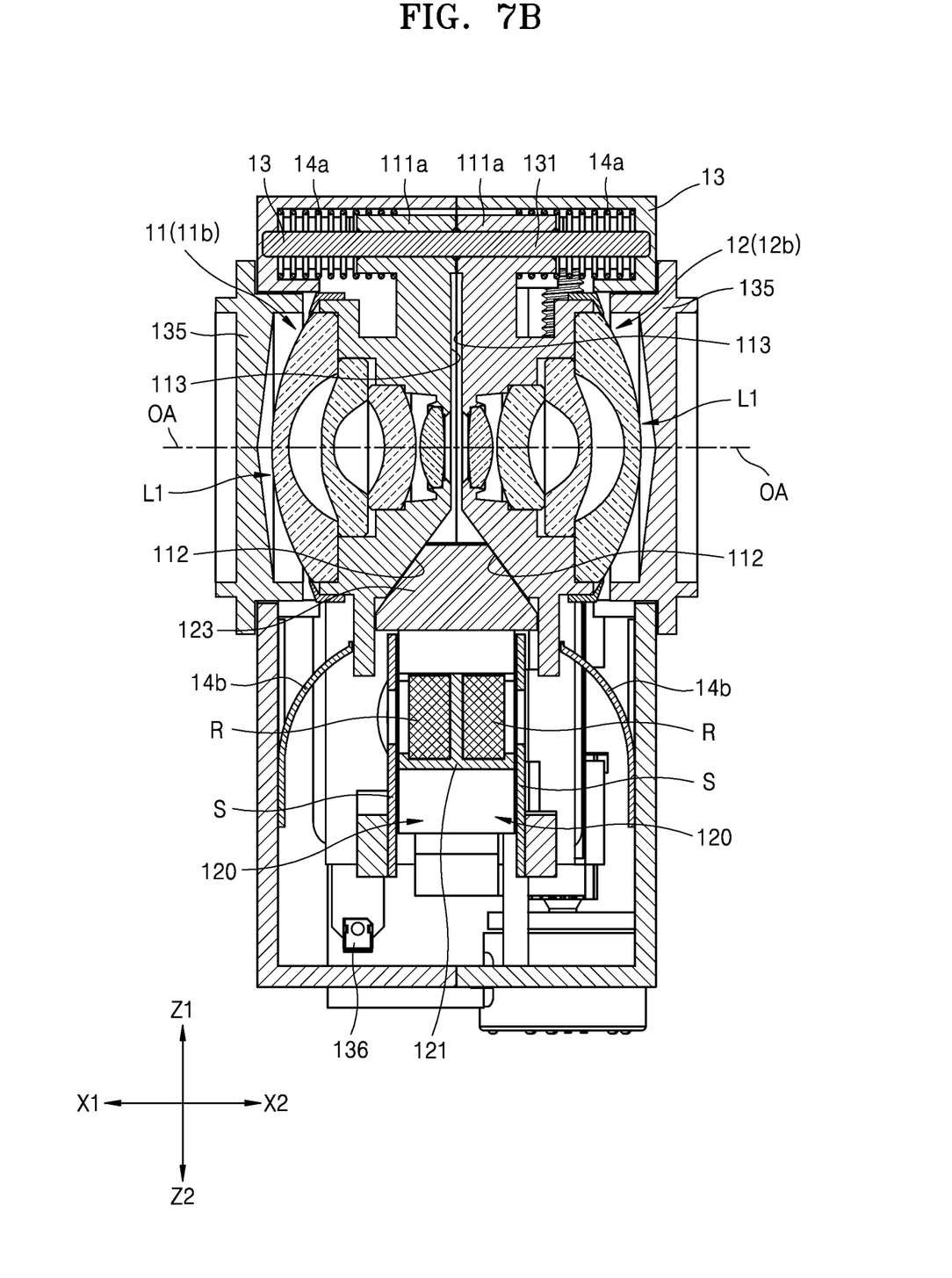
FIG. 7B is a cross-sectional view of the camera module of FIG. 6A, according to various embodiments of the present disclosure.

FIG. 5 is an exploded perspective view of the camera module 10 according to an embodiment. FIG. 6A is a perspective view illustrating the camera module 10 in an active state, and FIG. 6B is a cross-sectional view of the camera module of FIG. 6A, according to an embodiment. FIG. 7A is a perspective view illustrating the camera module 10 in an inactive state, and FIG. 7B is a cross-sectional view of the camera module of FIG. 7A, according to an embodiment.

Referring to FIG. 5, respective first frames 110 of first and second optical systems 11 and 12 are arranged in opposite directions to each other. Each of the first frames 110 may support first lens group L1.

A movement of positions of the first frames 110 may be interlocked with a movement of positions of the second frames 120. For example, the first frames 110 and the second frames 120 may move in synch. More particularly, each of the first frames 110 of the first and second optical systems 11 and 12 may come in contact with each of the second frames 120 of the first and second optical systems 11 and 12 to be separated from each other.

The first frames 110 may have contact surfaces capable of contacting the second frames 120, respectively. Each of the contact surfaces may have a slope 112 oblique to a moving direction of the second frame 120 and a parallel surface 113 parallel to the moving direction of the second frame 120.

Each of the first frames 110 may include at least one of first guide holes 111a and 111b. First guide members 131 (e.g., guide shafts) in the housing 13 may be inserted in the first guide holes 111a and 111b, respectively. The first guide holes 111a and 111b and the first guide members 131 may guide movements of the first frames 110. The first guide holes 111a and 111b and first guide members 131 may be collectively referred to as first guide units.

Each of the first guide holes 111a and 111b and the first guide members 131 may be plural. For example, the shapes of the first guide holes 111a may correspond to the shapes of the first guide members 131, and the shapes of other first guide holes 111b may be different from those of the first guide members 131. For example, when sectional shapes of a plurality of first guide members 131 have a circular cross-section, the first guide holes 111a may have a circular shape while the first guide holes 111b have an oval shape.

The camera module 10 may further include at least one of elastic members 14a and 14b, which provide an elastic force that pushes the first frames 110 of the first and second optical systems 11 and 12 towards each other. For instance, the camera module 10 may include the elastic members 14a and 14b providing an elastic force to the first frame 110 of the first optical system 11 in a second direction X2, and may include the elastic members 14a and 14b providing an elastic force to the first frame 110 of the second optical system 12 in a first direction X1.

The elastic members 14a and 14b providing an elastic force to each of the first frames 110 of the first and second optical systems 11 and 12, respectively, may be plural. For example, the elastic members 14a and 14b may be arranged and between which a first lens group L1 may be interposed. The elastic members 14a and 14b may include elastic bodies, respectively. As illustrated in the present example, the plurality of the elastic members 14a and 14b may include a coil spring and a plate spring, respectively.

Each of the second frames 120 may include at least one of the second guide holes 122. Second guide members 132 (e.g., guide shafts) in the housing 13 may be inserted in the second guide holes 122, respectively. The second guide holes 122 and the second guide members 132 may guide movements of the second frames 120. The second guide holes 122 and the second guide members 132 may be collectively referred to as second guide units.

The second frames 120 of the first and second optical systems 11 and 12 may be fixed to each other, respectively. Therefore, the second frames 120 may be moved in the same direction. For example, a base 121, which supports each reflector R of the second frames 120 of the first and second optical systems 11 and 12, may form one body.

The second frames 120 of the first and second optical systems 11 and 12 may further include gap maintaining members 123, respectively. The gap maintaining members 123 may be formed at an end of the base 121. The gap maintaining members 123 may contact the first frames 110 of the first and second optical systems 11 and 12 and may maintain gaps between the first frames 110. As the second frames 120 move in a direction perpendicular (or otherwise transverse) to the optical axis OA, the gap maintaining members 123 may sequentially contact with slopes 112 and parallel surfaces 113 of the first frames 110.

The camera module 10 may include one or more driving units 15. The driving units 15 may actuate the second frames 120 of the first and second optical systems 11 and 12. In some implementations, each of the driving units 15 may include a step motor 151 and a lead screw 152.

Any of the second frames 120 may receive a driving force from one of the driving units 15 by a clip 126 and a clip link 125. As the driving force is provided by two of the driving units 15 spaced apart from each other, the second frames 120 may receive the driving force while maintaining a balance. In some implementations, the driving force provided the second frame 120 of a given one of the first and second optical systems 11 and 12 by one of the two driving units 15 may be greater than a driving force provided to the first frame 110 of the given optical system by the elastic members 14a and 14b.

The camera module 10 may further include a stopper 133. The stopper 133 may restrict movements of the first frames 110 of the first and second optical systems 11 and 12 that are caused by the elastic members 14a and 14b. The stopper 133 may be arranged between the first frames 110 of the first and second optical systems 11 and 12. The stopper 133 may be disposed in the housing 13.

Furthermore, the camera module 10 may also include a detection sensor 136. The detection sensor 136 may detect a position of at least one of the first and second frames 110 and 120. For example, the detection sensor 136 may be arranged on a moving path of the second frame 120 and may detect the current position of the second frame 120 along the moving path.

Referring to FIGS. 6A and 6B, first and second optical systems 11 and 12 are in projection positions 11a and 12a. Gap maintaining members 123 of second frames 120 are arranged between first frames 110 of the first and second optical systems 11 and 12.

Both sides of the gap maintaining members 123 of the second frames 120 contact parallel surfaces 113 of the first frames 110 of the first and second optical systems 11 and 12. The first frames 110 may maintain prescribed gaps due to the gap maintaining members 123 of the second frame 120 even though the first frames 110 receive elastic forces in a mutually approaching direction by the elastic members 14a and 14b.

The reflectors R (see FIG. 2) of the first and second optical systems 11 and 12 may be arranged between the first lens groups L1 of the first frames 110.

According to an embodiment, in the camera module 10, light may be incident on the first and second optical systems 11 and 12 from a first direction X1 and a second direction X2, and it may be reflected by the reflector R to reach the image sensor IS. A user may perform 360° photography by using the electronic device 1 including the camera module 10.

As the driving units 15 are operated when the first and second optical systems 11 and 12 are located in the projection positions 11a and 12a, a driving force may be provided to the second frame 120. Since a second guide member 132 is inserted into a second guide hole 122 (see FIG. 5) of the second frame 120, the second frame 120 may move in a direction perpendicular (or otherwise transverse) to an optical axis OA as a driving force is provided. For example, the second frame 120 may move in a direction perpendicular (or otherwise transverse) to first and second optical axes OA1 and OA2, for example, in a Z2 direction.

Since the second frames 120 of the first and second optical systems 11 and 12 move in a direction perpendicular (or otherwise transverse) to the second optical axis OA2, the second frames 120 may move in a same direction. Therefore, the space for moving the second frames 120 may be reduced. Moreover, a control of moving a position of the second frames 120 may be easier.

Referring to FIGS. 7A and 7B, as the second frames 120 may move in a direction perpendicular (or otherwise transverse) to the second optical axis OA2, the first frames 110 of the first and second optical systems 11 and 12 may move towards one another.

A reflector R and gap maintaining members 123 supported by or formed in second frames 120 may move together with the second frames 120. The reflector R may be located in a position deviated from the optical axis OA. For example, the reflector R may be misaligned with the optical axis OA. First guide members 131 are inserted in first guide holes 111a of the first frames 110, and the first frames 110 of the first and second optical systems 11 and 12 are subject to elastic forces produced by elastic members 14a and 14b in opposing directions. As the gap maintaining members 123 move, the first frames 110 of the first and second optical systems 11 and 12 may move towards one another.

When the first and second optical systems 11 and 12 of the camera module 10 are in storage positions 11b and 12b, the first frames 110 of the first and second optical systems 11 and 12 may be aligned in a certain position by a stopper 133. This is because of restricting moving distances of the first frames 110 of the first and second optical systems 11 and 12 by the stopper 133 in a housing 13, even if the elastic force applied to the first frame 110 of the first optical system 11 is different from the elastic force applied to the first frame 110 of the second optical system 12.

Furthermore, the camera module 10 may move the first and second optical systems 11 and 12 from the storage positions 11b and 12b to projection positions 11a and 12a. For example, as driving units 15 provide the camera module 10 with driving forces in the opposite direction, the second frames 120 may move in a Z1 direction. As the second frames 120 move, the gap maintaining members 123 in the second frames 120 may move while sequentially contacting slopes 112 and parallel surfaces 113 of the first frames 110. The gap maintaining members 123 may contact and press the slopes 112 and parallel surfaces 113 of the first frames 110, and thus, the first frames 110 of the first and second optical systems 11 and 12 may move in a direction away from each other. The reflector R may be aligned with the optical axis OA.

According to the above embodiments, as the camera module and the electronic device including the same are designed to perform position moving of two optical systems for 360° photographing, retracted thickness of the two optical systems may be minimized.

Furthermore, as the camera module and the electronic device including the same are received in a housing when it is not being used, lenses in an optical system may be safely protected.

Meanwhile, the camera module 10 mostly includes two optical systems in the above embodiments, but the number of optical systems included in the camera module 10 is not limited thereto and may be three or more. For example, the camera module 10 may include four or six optical systems.

To promote understanding of one or more exemplary embodiments of the present disclosure, reference has been made to the exemplary embodiments illustrated in the drawings, and specific terminology has been used to describe these exemplary embodiments. However, no limitation of the scope of the present disclosure is intended by this specific terminology, and the exemplary embodiments of the present disclosure should be construed to encompass all exemplary embodiments that would normally occur to one of ordinary skill in the art.

Terms such as "mechanism", "element", "means" and "formation" may be widely used, and not limited to mechanical and physical formations. Terms above may include meanings of series of routines of software related to a processor, etc.

The particular implementations shown and described herein are illustrative examples of the present disclosure and are not intended to otherwise limit the scope of the present disclosure in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present disclosure unless the element is specifically described as "essential" or "critical." Expressions such as "including" and "equipped with" are technical open transitions.

The use of the terms "a", "an", and "the" and similar referents in the context of describing the present disclosure (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better illuminate the present disclosure and does not pose a limitation on the scope of the present disclosure unless otherwise claimed. Numerous modifications and adaptations will be readily apparent to one of ordinary skill in the art without departing from the spirit and scope of the present disclosure.

FIGS. 1-7B are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While one or more embodiments have been described with reference to the figures, it will be understood by those of ordinary skill in the art that various changes in form and details may be made therein without departing from the spirit and scope as defined by the following claims.

What is claimed is:

1. A camera module comprising:
   a first optical system and a second optical system that are arranged in opposite directions to each other in a housing,
   each of the first and second optical systems including:
   a first frame configured to support a first lens group and move along an optical axis in a first direction; and
   a second frame configured to support a reflector configured to reflect light passing through the first lens group, and move in a second direction that is different from the first direction, wherein the optical axis comprises a first optical axis extending through the first lens group and a second optical axis that is transverse to the first optical axis, the first frame is configured to move along the first optical axis, and the second frame is configured to move in a direction transverse to the first optical axis and the second optical axis, wherein the first frame of the first optical system is arranged to move in synch with the second frame of the first optical system, wherein the first frame comprises a contact surface arranged to contact the second frame, and the contact surface has a slope oblique relative to a movement path of the second frame and a parallel surface parallel to the moving path of the second frame, wherein the second frame comprises a gap maintaining member, wherein each of the first and second optical systems is arranged to move between a projection position wherein at least a part of the first lens group projects outside the housing and a storage position wherein the first lens group is stored in the housing, and wherein, when the first optical system and the second optical system are in the projection position, the gap maintaining member contacts with the parallel surface of the first frame to maintain a gap between the first frame of the first optical system and the first frame of the second optical system.

2. The camera module of claim 1, wherein, when the first optical system and the second optical system are in the storage position, the reflectors of the second frames are out of alignment with the optical axis.

3. The camera module of claim 1, wherein the first frames of the first optical system and the second optical system are arranged to move in opposite directions, and the second frames of the first optical system and the second optical system are arranged to move in a same direction.

4. The camera module of claim 1, further comprising at least one elastic member configured to apply an elastic force on at least one of the first frames.

5. The camera module of claim 4, further comprising a stopper arranged to restrict movements of the first frames of the first and second optical systems.

6. The camera module of claim 1, further comprising:
a first guide member arranged to guide the first frames; and
a second guide member arranged to guide the second frames.

7. The camera module of claim 1, further comprising a sensor configured to detect a position of at least one of the first and second frames.

8. The camera module of claim 1, further comprising a driving unit arranged to move at least one of the second frames.

9. The camera module of claim 1, further comprising a lens cover arranged to protect each of the first lens groups of the first and second optical systems when the first and second optical systems are in a storage position.

10. The camera module of claim 1, wherein the second frame is further configured to support an image sensor for receiving light reflected by the reflector.

11. The camera module of claim 10, wherein the second frame is further configured to support a second lens group arranged between the reflector and the image sensor.

12. An electronic device comprising a camera module, the camera module comprising:
a first optical system and a second optical system that are arranged in opposite directions to each other in a housing, each of the first and second optical systems including:
a first frame configured to support a first lens group and move along an optical axis in a first direction; and
a second frame configured to support a reflector configured to reflect light passing through the first lens group, and move in a second direction that is different from the first direction, wherein the optical axis comprises a first optical axis extending through the first lens group and a second optical axis that is transverse to the first optical axis, the first frame is configured to move along the first optical axis, and the second frame is configured to move in a direction transverse to the first optical axis and the second optical axis, wherein the first frame of the first optical system is arranged to move in synch with the second frame of the first optical system, wherein the first frame comprises a contact surface arranged to contact the second frame, and the contact surface has a slope oblique relative to a movement path of the second frame and a parallel surface parallel to the moving path of the second frame, wherein the second frame comprises a gap maintaining member, wherein each of the first and second optical systems is arranged to move between a projection position wherein at least a part of the first lens group projects outside the housing and a storage position wherein the first lens group is stored in the housing, and wherein, when the first optical system and the second optical system are in the projection position, the gap maintaining member contacts with the parallel surface of the first frame to maintain a gap between the first frame of the first optical system and the first frame of the second optical system.

13. The camera module of claim 1, wherein when the first optical system and the second optical system are in the storage position, the gap maintaining member contacts with the slope of the first frame.

* * * * *